United States Patent [19]

Wagstaff et al.

[11] Patent Number: 4,648,057

[45] Date of Patent: Mar. 3, 1987

[54] ROBUST ITERATIVE TECHNIQUE FOR HIGH-RESOLUTION SPATIAL PROCESSING AND SPECTRAL ESTIMATION

[75] Inventors: Ronald A. Wagstaff, Slidell, La.; Jean L. Berrou, Lerici, Italy

[73] Assignee: The United States of America as represented by the Secretary of the Navy, Washington, D.C.

[21] Appl. No.: 611,811

[22] Filed: May 18, 1984

[51] Int. Cl.[4] .............................................. G06F 15/31
[52] U.S. Cl. ..................................... 364/726; 364/576; 342/192
[58] Field of Search ............. 364/726, 576; 343/5 SH, 343/5 FT

[56] References Cited

U.S. PATENT DOCUMENTS

| 3,573,446 | 4/1971 | Bergland | 364/726 |
| 3,876,946 | 4/1975 | LaClair et al. | 364/726 |
| 4,207,624 | 6/1980 | Dentino et al. | 364/726 |
| 4,212,084 | 7/1980 | Poole | 367/118 |
| 4,501,149 | 2/1985 | Konno et al. | 364/576 |
| 4,559,605 | 12/1985 | Norsworthy | 364/726 |

Primary Examiner—David H. Malzahn
Attorney, Agent, or Firm—T. M. Phillips

[57] ABSTRACT

A nonlinear technique for high-resolution data processing produces high-resolution power spectra from the output of a conventional processor. First, a "guess" of the spectral estimate is formed. Then the spectral estimate is convolved with the system response function to produce estimated output levels. The differences between the estimated output levels and the measured output levels are used to modify the spectral estimate to produce a new "guess". This process is repeated until certain criteria are satisfied.

3 Claims, 10 Drawing Figures

ROBUST ITERATIVE TECHNIQUE FOR HIGH-RESOLUTION SPATIAL PROCESSING AND SPECTRAL ESTIMATION

BACKGROUND OF THE INVENTION

1. Field of the Invention

The present invention relates to data processing techniques, and more particularly to a nonlinear technique for high-resolution data processing to diminish the effect of system corruption.

2. Description of the Prior Art

Prior data processing techniques, such as the maximum entropy and maximum likelihood methods, are described by J. P. Burg in his Ph. d. dissertation entitled "Maximum Entropy Spectral Analysis" at the Department of Geophysics, Stanford University, Stanford, Calif. in May 1975, and by J. Capon in the Proceedings of the IEEE, Vol. 57, pp. 1408–1418, August 1969, entitled "High-resolution Frequency Wave Number Spectrum Analysis", respectively. These approaches use the input time series data and perform mathematical operations on the power levels directly. The results are complex methods having long averaging times and high computational loads.

A general iterative technique is described by R. A. Wagstaff in the Journal of the Acoustic Society of America, Vol. 63, pp. 863–869, 1978, entitled "Iterative Technique for Ambient Noise Horizontal Directionality Estimation from Towed Line-Array Data". The described technique produces a deconvolved spatial spectra for one time period and one heading.

What is desired is a simple, fast technique that can produce high-resolution spectra from the output of a conventional processor, such as a beamformer or spectrum analyzer.

SUMMARY OF THE INVENTION

Accordingly, the present invention provides a nonlinear technique for high-resolution data processing which produces high-resolution power spectra from the output of a conventional processor. First, a "guess" of the spectral estimate is formed. Then the spectral estimate is convolved with the system response function to produce estimated output levels. The differences between the estimated output levels and the measured output levels are used to modify the spectral estimate to produce a new "guess". This process is repeated until certain criteria are satisfied.

Therefore, it is an object of the present invention to provide a simple and fast technique for obtaining high-resolution power spectra.

Another object of the present invention is to provide high-resolution power spectra from the output of a conventional processor.

Yet another object of the present invention is to provide a nonlinear technique for producing high-resolution power spectra which uses simple mathematical operations.

Still another object of the present invention is to provide a nonlinear technique for producing high-resolution power spectra which is robust, i.e., relatively insensitive to system and measurement errors.

Other objects, advantages and novel features of the present invention will be apparent from the following detailed description when read in conjunction with the appended claims and attached drawing.

DESCRIPTION OF THE PREFERRED EMBODIMENT

Figure 1:
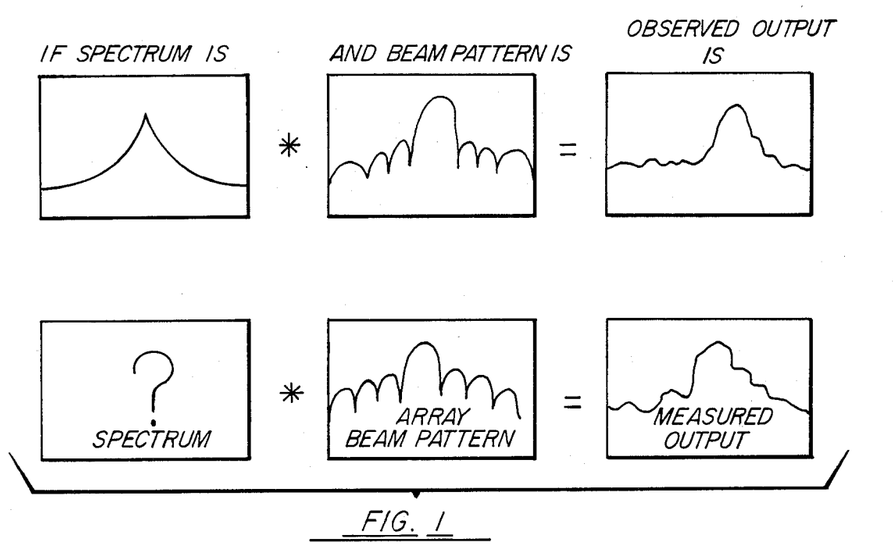
FIG. 1 is a pictorial representation of the problem addressed by the present invention.
Figure 2:
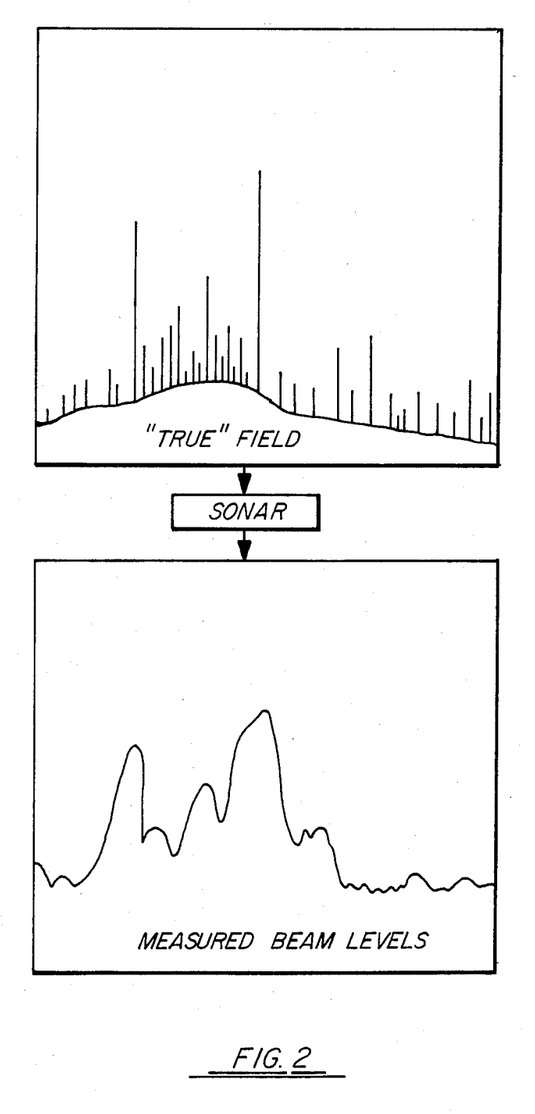
FIG. 2 is a graphic representation of the effect of a system upon the received acoustic field.

The basic philosophy of the nonlinear technique described herein as shown in FIGS. 1 and 2 is that a model of a source signal can be constructed from (1) the output data of a system and (2) knowledge of the system response function, which model will give a high-resolution spectral estimate of the source signal. The technique is described in terms of a sonar system which has a line array with outputs in the form of a set of measured beam levels from a beamformer. The system response function required is a set of beam patterns for the array. These two sets are all that are required by this technique to estimate the spatial spectrum of the acoustic field being observed.

Figure 3:
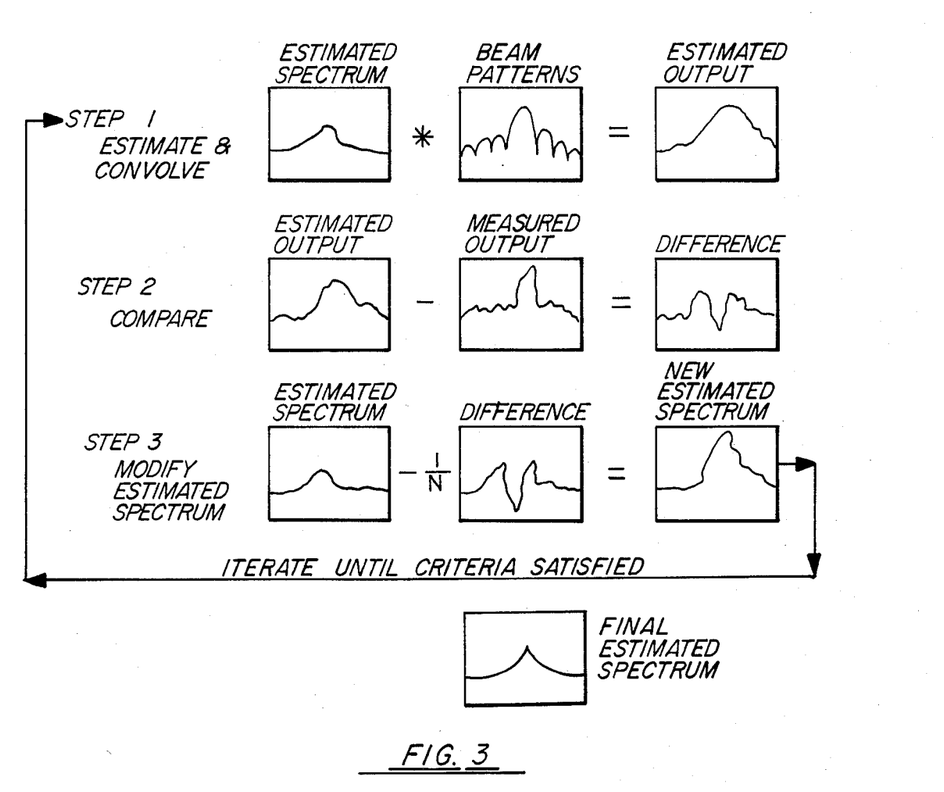
FIG. 3 is a pictorial representation of the nonlinear technique for high-resolution data processing according to the present invention.
Figure 4:
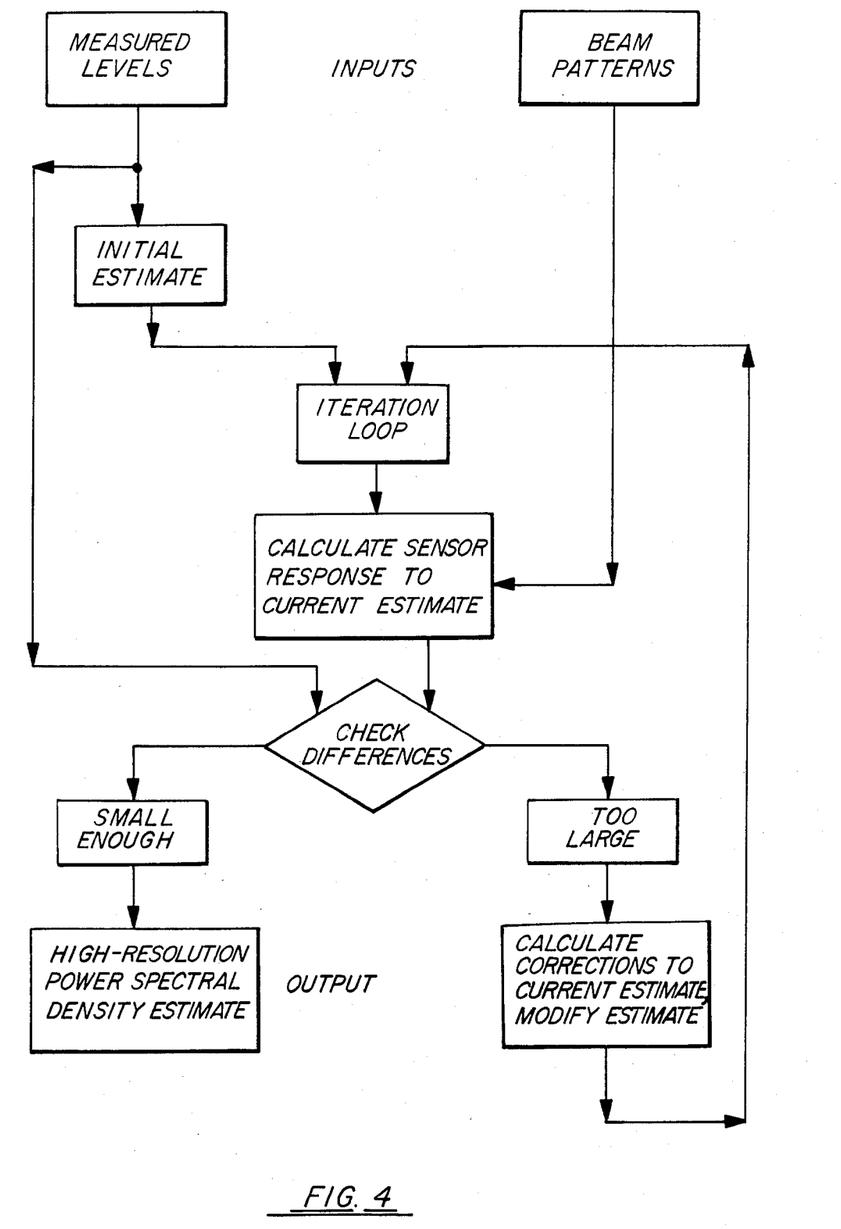
FIG. 4 is a flow chart of the data processing technique according to the present invention.
Figure 5:
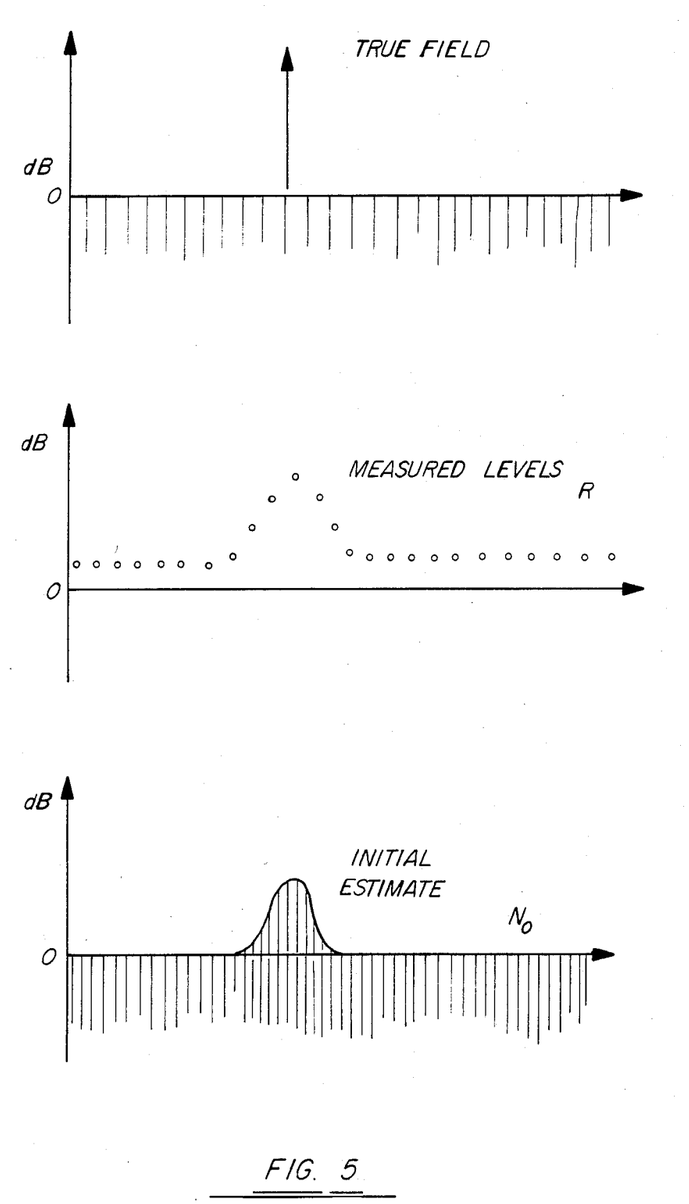
FIG. 5 is a pictorial representational of the choice of an initial field estimate.

Referring now to FIGS. 3 and 4 the procedure by which the present technique generates a high-resolution spectral estimate is as follows. First, a guess or estimate of the spectrum is made. This "guess" can be nearly any smooth function including a flat spectrum, but is generally a normalized copy of the initial measured response output as shown in FIG. 5. This spectral estimate is convolved with the beam patterns of the array to get estimated beam levels. For most applications it is sufficient to use only the mainlobe beam pattern response. Second, these estimated beam levels are compared with the measured beam levels from the beamformer. Third, the differences in the estimated and measured beam levels are used to modify the spectral estimate within the coverage area (generally only the area covered by the mainlobes) of the beams to generate a new "guess". This process is repeated until certain criteria are satisfied. Then the iterations stop and the result is a high-resolution spectral estimate of the acoustic field.

The iterative process can be viewed as a computerized technique for the gradual molding of a lump of clay (the spectral estimates). By successively using the beam differences, which change with each iteration, the peaks and troughs in the clay can be gradually broadened or narrowed to reduce the differences to zero or to an acceptable level. When this is achieved it can be said that the system cannot tell the difference between the spectral estimate and the measured spectrum.

The spectral estimate is generated from the previous one as explained below where u = independent variable
i = beam number
I = total number of system outputs (or beams)
j = iteration number
$N_j(u)$ = power level of jth spectral estimate
$B_i(u)$ = beamformer power level response function of ith beam (usually $\leq O$ with O on beam boresight)
$R_i$ = beamformed output level of ith beam
$\bar{R}_{i,j}$ = estimate of ith beamformed output level obtained from jth spectral estimate $$= 10 \log \sum_{i=1}^{I} 10^{(N_j + B_i)/10}$$

$\Delta R_{i,j} = \bar{R}_{i,j} - R_i$
$C_j(u)$ = accumulation of changes $\Delta'_{i,j}(u)$ in level plus a pedestal (P) to be made to jth spectral estimate $N_j(u)$
$\Delta_{i,j}(u)$ = part of the function $N_j + B_i$ above the threshold $t_a$ or $t_s$
$\Delta 1_{i,j}(u) = \Delta_{i,j}(u)(-\Delta R_{i,j})/T$ where $T = t_a$ or $t_s$ as appropriate
P = a pedestal equal to 0,5
$A_j(u)$ = step function equal to P plus number of times a particular $N_j(u)$ is to be changed ($A_j(u) \geq P$)
$\hat{A}_j(u) = A_j(u)$ smoothed over the variable u ($\hat{A}_j(u) \geq P$)
$t_a$ = threshold for adding decibels to $N_j(u)$ (6 dB is representative)
$t_s$ = threshold for subtracting decibels from $N_j(u)$ (10 dB is representative)

The algorithm can be summarized by the recursive relation $$N_{j+1} = N_j + C_j/\hat{A}_j \quad (\hat{A}_j \geq P) \quad (1)$$
where $$C_j = \sum_{i=1}^{I} \Delta_{i,j} \quad (2)$$

with stopping criteria that $j \leq K$, an arbitrary number such as 25, or where the root means square error $\sigma_j$ is minimum or some arbitrary low value such as 0.001 dB where $$\sigma_j = \left[ \sum_{i=1}^{I} \Delta R_{i,j}^2 \right]^{\frac{1}{2}} \quad (3)$$

Figure 6:
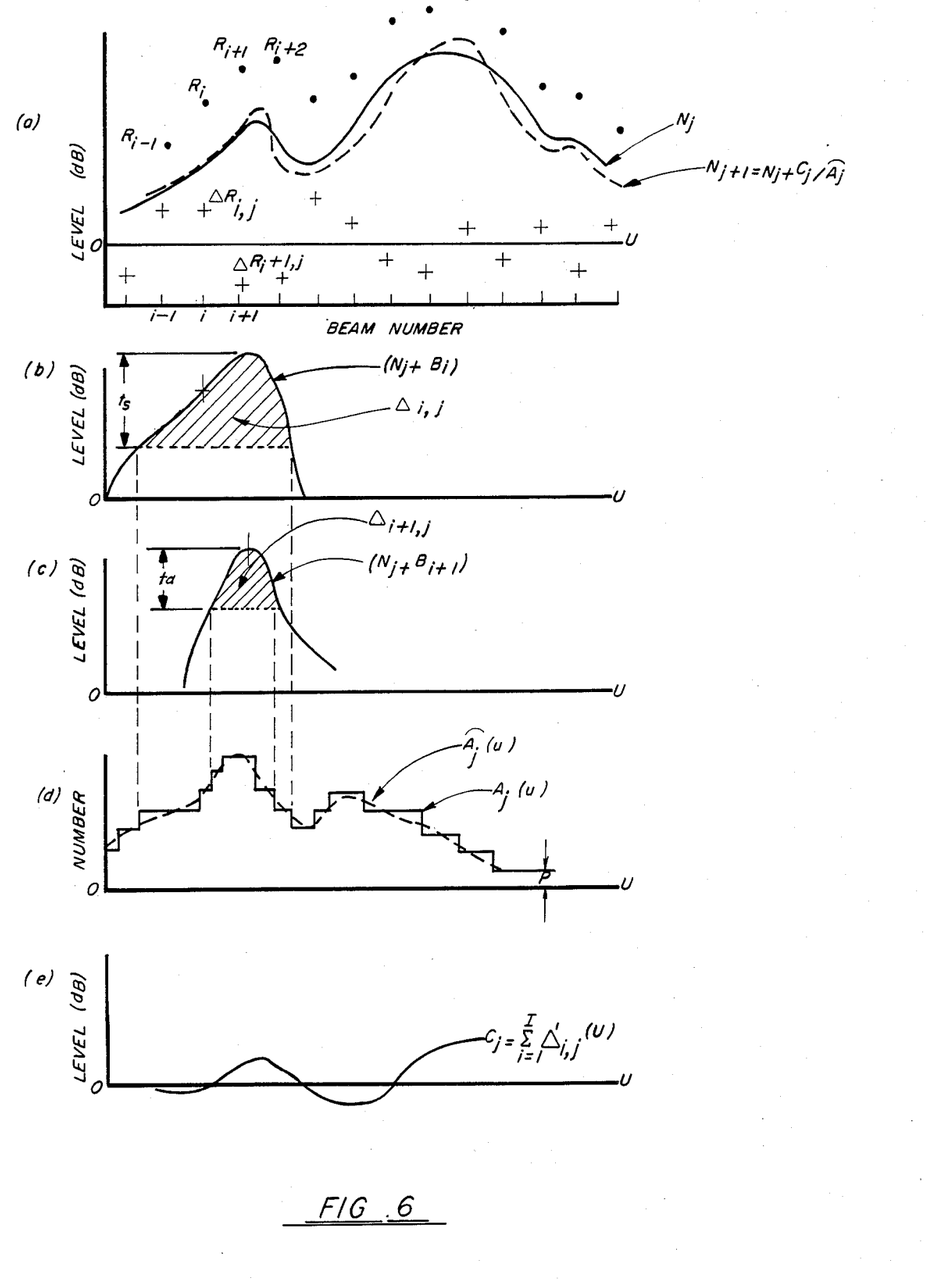
FIG. 6 consisting of (a)–(e) is a graphic illustration of the nonlinear technique for high-resolution data processing according to the present invention.

In the case where the outputs $R_i$ are from a fast Fourier transform (FFT) beamformer, the calculation of $\sigma_j$ is over only the beams in real acoustic FIG. 6 contains several plots to illustrate the present technique. Plot (a) contains a solid curve for the jth spectral estimate $N_j$ (j could be zero for the first spectral estimate, or "guess") and a dashed curve for the j+1 spectral estimate. The circles above $N_j$ are the beamformer output levels $R_i$. The +'s distributed along the u axis about 0 dB are the errors or differences $\Delta R_{i,j}$ which indicate the quality of the estimated spectrum. In this case $N_j$ needs improvement. For this example the modification procedure will be illustrated with beams i and i+1. The modification of the other beams will be omitted in the discussion, but it is understood that they go through the same process during one complete iteration. The order in which beams are considered is not important. They could be considered simultaneously using vector instructions to increase computation speed. It is only necessary that the functions $C_j$ and $A_j$ contain the accumulated results from all beams within the spectral range for which resolution is being improved.

The solid curves of the plots 6(b) and 6(c) are plots of $N_j + B_i$ and $N_j + B_{i+1}$, the parts of the spectral estimate which contribute power to the spectral areas covered by beams i and i+1. Since they are of $N_j + B_i$ and not just $N_j$ in the beam coverage areas, they give the relative contribution of $N_j$ to the beam power in the individual beams. The relative contribution at a given u determines the shape of these curves. The highest level contributes the most. This point could occur at almost any location in the beam coverage area, not just near beam boresight.

The first difference considered, $\Delta R_{i,j}$, is positive. This indicates that the spectral estimate $N_j$ is too high within the beam coverage are a of beam i and needs to be reduced. This is accomplished by normalizing $\Delta_{i,j}$, the shaded area above the threshold $t_s$, by multiplying it by the ratio-$R_{i,j}/t_s$ to form $\Delta'_{i,j}$ and accumulating in $C_j$ (plot 6(e)). By this means the modification of $N_j$ is done at the locations in u where $N_j + B_i$ is above the threshold, not where the values of $N_j$ are the greatest within the beam coverage area. This is done because fewer decibels need to be added or removed to affect $\Delta R_{i,j}$ and a better fit is obtained. These are nonlinear (in power) operations that are responsible for some of the attractive features of this technique.

Plot 6(d) contains the functions $A_j$ and $\hat{A}_j$. The step function $A_j$ is an accumulator that contains P, which is 0.5, for this illustration, plus the number of times $N_j$ is modified at a given u. The function $\hat{A}_j$ is simply the function $A_j$ passed through a smoother.

Plot 6(c) contains $N_j + B_{i+1}$. In this case the difference $R_{i=1,j}$ is negative which indicates decibels must be added to $N_j$ within the beam coverage area of beam i+1. Therefore, $\Delta'i+1j$ will be stored in the accumulator $C_j$ and the accumulator $A_j$ will be incremented one unit for all u covered by $\Delta_{i+1,j}$.

The values of $t_a$ and $t_s$ have been empirically chosen to be 6 and 10 dB, respectively. The reason for the difference between the two is that spectral lines are narrow and are produced in the present technique by addition. No matter how narrow the lines are, they are still detectable by the sonar system provided they have sufficient level. Hence, the range in u for addition should be narrower than for substraction. However, troughs or holes in the spectral estimate must be broad or they cannot be justified by the data. a very narrow, low level hole in the spectrum is not detectable in the system output and should not be accepted in the spectral estimate. Thus, the subtraction of energy should be carried out over a wider spectral band than the addition to avoid creating "invisible" holes in the spectrum.

The complete spectrum is obtained by applying the above-described procedure to all other beams.

Finally, the step function for $\hat{A}_j$ is smoothed to produce $\hat{A}_j$, shown as the dashed curve in FIG. 6(d). This smoothing is necessary to keep the final correction function $C_j/\hat{A}_j$ without discontinuities and $N_{j+1}$ reasonably smooth. $N_{j+1}$ is obtained by adding $C_j/\hat{A}_j$ to $N_j$ as illustrated by the dashed curve in plot 6(a) which also contains $N_j$. The differences between the two estimates ($N_j$ and $N_{j+1}$) result from one iteration of the present technique.

FIG. 6 is for illustration purposes and the values are not to scale. Further, the functions $A_j$, $\hat{A}_j$, $C_j$ and $N_j$ cannot be obtained for a given range in u without using all $B_i$ which contain any u within that range. For example, if results for only a small angular section are desired, as few as five out of 64 beams could be used in the spectral estimate for the range of u of interest (assuming $B_i$ is limited to the mainlobe response). This permits reducing the computational load and "zooming in" on interesting subsets.

The following algorithm of the present technique has been coded in FORTRAN for a minicomputer to use 64 or 128 beam (I) levels to estimate the acoustic field (N) on either 1024 or 512 points (u).

```
0001    FTN4,L
0002          PROGRAM NEWIT
0003    C
0004    C     ************************************************************
0005    C
0006          COMMON LEVEL(64), IRES, IRSP(500), IBC(64),LFELD(1024), IT,
0007         + NFELD(1024), NFDIF(1024), IBW, PI, ISLOB, TOTLI, SL,
0008         + NCORR(1024), IDIF(64), IHWMB, IH3DB, IB, IRESP, ISLSH, LTHRS, INFRQ,
0009         + N, IDIFF, IOVLP, SLSH, ICNV, STDIF, STDIFA, TEPCT(64,4), TWPCT(64,4),
0010         + MLOOP, AVG(64,4), AVGPR(64,4), IFRQ(4), FMED(64,4), ISTRT(4), IEND(4)
0011    C
0012    C
0013          DIMENSION BDAT(64,4)
0014    C
0015    C
0016    C     Read data from file $PLDAT
0017    C
0018          CALL NWDAT
0019    C
0020    C     Select statistics to be deconvolved
0021    C
0022    16    WRITE(1,1000)
0023    1000  FORMAT(" ENTER TYPE OF DATA TO BE PROCESSED ",/,
0024         + " 0 TO STOP PROGRAM ",/," 1 FOR AVGPR ",/," 2 FOR AVGDB ",/,
0025         + " 3 FOR MEDIAN ",/," 4 FOR 10 %TILE",/," 5 FOR 20 %TILE")
0026          READ (1,*)IT
0027          IF(IT.LT.0.OR.IT.GT.5) GO TO 16
0028          IF(IT.EQ.0) STOP
0029          IF(IT.NE.1) GO TO 17
0030          DO 27 INFRQ=1,4
0031          DO 28 I=1,64
0032    28    BDAT(I,INFRQ)=AVGPR(I,INFRQ)
0033    27    CONTINUE
0034          GO TO 50
0035    17    IF(IT.NE.2) GO TO 18
0036          DO 29 INFRQ=1,4
0037          DO 30 I=1,64
0038    30    BDAT(I,INFRQ)=AVG(I,INFRQ)
0039    29    CONTINUE
0040          GO TO 50
0041    18    IF(IT.NE.3) GO TO 19
0042          DO 31 INFRQ=1,4
0043          DO 32 I=1,64
0044    32    BDAT(I,INFRQ)=FMED(I,INFRQ)
0045    31    CONTINUE
0046          GO TO 50
0047    19    IF(IT.NE.4) GO TO 20
0048          DO 33 INFRQ=1,4
0049          DO 34 I=1,64
0050    34    BDAT(I,INFRQ)=TEPCT(I,INFRQ)
0051    33    CONTINUE
0052          GO TO 50
0053    20    DO 35 INFRQ=1,4
0054          DO 36 I=1,64
0055    36    BDAT(I,INFRQ)=TWPCT(I,INFRQ)
0056    35    CONTINUE
0057    50    CONTINUE
0058    C
0059    C     Deconvolve for each frequency
0060    C
0061          DO 6 INFRQ=1,4
0062    C
0063    C     Get real beams limits to bound beams for standard deviation
0064    C     calculation and convergence tests
0065    C
0066          ISTR=ISTRT(INFRQ) -2
0067          IF(ISTR.LT.1)ISTR=1
```

```
0068          ILST=IEND(INFRG)+2
0069          IF(ILST.GT.64)ILST=64
0070   C
0071   C      Read measured beam levels in array LEVEL
0072   C
0073          DO 90 I=1,64
0074     90   LEVEL(I)=IFIX(BDAT(I,INFRG)*10.)
0075   C
0076   C      Set the field resolution , IRES is the number of cells
0077   C      to be estimated
0078   C
0079          IRES=512
0080          PI=3.1415926536
0081   C
0082   C      ISLDB is the estimated side lobe rejection of the array
0083   C      in tenths of a dB .
0084   C
0085          ISLDB=500
0086   C
0087   C      Compute Beam ReSPonse for distance I from beam center
0088   C
0089   C       The beam extension is (2*IOVLP/10+1)
0090   C       IOVLP is in 10th of beam spacing
0091   C
0092          IOVLP=60
0093          CALL BRESP
0094   C
0095   C      get beam center "direction" IBC(N)
0096   C
0097          DO 1 N=1,64
0098       1  IBC(N)=(IRES/128)+((IRES/64)*(N-1))
0099   C
0100   C      Call OREST to get the 1st (ORiginal) ESTimate to start
0101   C      the iteration
0102   C
0103          CALL OREST
0104   C
0105   C       Initialise STDIFA ,the old standard deviation , and MLOOP ,
0106   C       the loop number .
0107   C
0108          STDIFA=10.E18
0109          MLOOP=0
0110   C
0111   C      *************************
0112   C      **  ITERATION LOOP 3   **
0113   C      *************************
0114   C
0115       3  CONTINUE
0116   C
0117   C       Calculate omni field (used for side lobe contributions)
0118   C       and zero array NFDIF used to store field corrections
0119   C
0120          TOTLIA=TOTLI
0121          TOTLI=0.0
0122          DO 4 I=1,IRES
0123          NFDIF(I)=0
0124          NCORR(I)=0
0125       4  TOTLI=TOTLI+10.**(FLOAT(NFELD(I))/100.)
0126   C
0127   C       For every beam ,
0128   C
0129          DO 5 N=1,64
0130   C
0131   C      Get IDIF(N) (Difference modelled-measured beam level)
0132   C      and corrections to field (pooled in NFDIF(I))
0133   C      also store number of corrections per bin in array NCORR
0134   C
0135       5  CALL CNVLV
0136   C
0137   C      ****************************************************
0138   C      Compute statistics of beam differences for the loop
0139   C      ****************************************************
0140          ADIFA=ADIF
0141          ADIF=0.
0142          RDIF=0.
0143          DO 11 N=ISTR,ILST
0144          DIF=FLOAT(IDIF(N))/10.
0145          ADIF=ADIF+DIF
```

```
0146        11   CONTINUE
0147             ADIF=ADIF/(ILST+1-ISTR)
0148             DO 12 N=ISTR,ILST
0149             DIF=FLOAT(IDIF(N))/10.-ADIF
0150        12   RDIF=RDIF+DIF*DIF
0151             STDIF=SQRT(RDIF/(ILST-ISTR))
0152    C
0153    C        for the first and last loop ,print loop number ,average ,and
0154    C        standard deviation of the beam differences
0155    C
0156             IF(MLOOP.EQ.0.OR.STDIFA.LT.STDIF.OR.MLOOP.EQ.25)
0157            + WRITE(6,1020)MLOOP,STDIF,ADIF
0158      1020 FORMAT(" LOOP NUMBER ",I3," STDIF= ",F5.3," ADIF= "F5.3)
0159    C
0160    C
0161    C        If this loop did not reduce difference standart deviation
0162    C        exit from iteration with previous results
0163    C        Do not exit before the 5th loop or after the 25th
0164    C
0165             IF((STDIFA.LE.STDIF.AND.MLOOP.GE.5).OR.MLOOP.GE.25) GO TO 15
0166    C
0167    C        Correct NFELD and statistics , then reiterate
0168    C
0169             MLOOP=MLOOP+1
0170             STDIFA=STDIF
0171    C
0172    C        Smooth the array containing the number of beams requiring
0173    C        correction for a given cell
0174    C
0175             ISMUZ=IRES/128
0176             CALL SMUZ(NCORR,ISMUZ,IRES)
0177    C
0178    C        Store the last field NFELD in array LFELD ,
0179    C        then correct it for the next loop
0180    C
0181             DO 13 I=1,IRES
0182    C
0183    C        The array NFDIF contains the pooled corrections to the field
0184    C        in 10th of a dB . It needs to be normalised : that is done by
0185    C        dividing it by a number proportional to the array NCORR which
0186    C        contains the (smoothed) number of beams asking for a correction
0187    C        for each cell. The correction is scaled to insure fast
0188    C        and stable convergence of the iteration .
0189    C
0190             IF(NCORR(I).GT.0)ICORR=NFDIF(I)/(((NCORR(I)+6)*10)/(3*ISMUZ+1))
0191    C
0192    C        The next line is to prevent sharp holes to be artificially
0193    C        induced by repeatingly decreasing the field on a few isolated
0194    C        cells because of the clipping inherent in the integer mathematics
0195    C
0196             IF(ICORR.EQ.0.AND.NFDIF(I).LT.0)ICORR=-1
0197             NFDIF(I)=ICORR
0198             LFELD(I)=NFELD(I)
0199        13   NFELD(I)=NFELD(I)+ ICORR
0200    C
0201    C        Get back to top of loop 3
0202    C
0203    C
0204    C        Plot all data every 5th loop
0205    C
0206    C        IF((MLOOP/5*5).EQ.MLOOP)CALL WITPL(1)
0207             GO TO 3
0208    C        ******************************
0209    C        *                            *
0210    C        *    PLOT RESULTS            *
0211    C        *                            *
0212    C        ******************************
0213    C
0214        15   TOTLI=10.*ALOGT(TOTLIA)-ADIFA
0215             IF(IT.EQ.1)WRITE(6,1023)
0216             IF(IT.EQ.2)WRITE(6,1024)
0217             IF(IT.EQ.3)WRITE(6,1025)
0218             IF(IT.EQ.4)WRITE(6,1026)
0219             IF(IT.EQ.5)WRITE(6,1027)
0220      1023 FORMAT(" POWER AVERAGE ")
```

```
0221    1024 FORMAT(" DECIBEL AVERAGE ")
0222    1025 FORMAT(" MEDIAN ")
0223    1026 FORMAT(" 10 %TILE ")
0224    1027 FORMAT(" 25 %TILE ")
0225         WRITE(6,1021) TOTLI
0226    1021 FORMAT(" OMNI NFELD LEVEL :",F6.2," DB")
0227         DO 8 I=1,IRES
0228    8    NFELD(I)=LFELD(I)+IFIX(10.*ADIFA)
0229         CALL WITPL(2)
0230    6    CONTINUE
0231         GO TO 16
0232         END
   FTN4 COMPILER: HP92060-16092 REV. 2001 (791101)
   ** NO WARNINGS ** NO ERRORS **   PROGRAM = 01504     COMMON = 07388
0233         SUBROUTINE SMUZ(NSMUZ,ISMUZ,IDIM)
0234    C
0235    C    ****************************************************
0236    C    Subroutine SMUZ smoothes the array NSMUZ of dimension IDIM
0237    C    with a square window of size 1+2*ISMUZ ,the result is stored
0238    C    in NSMUZ ,but not normalized , it should be divided by 1+2*ISMUZ
0239    C    ****************************************************
0240    C
0241         DIMENSION MSMUZ(1024)
0242         DIMENSION NSMUZ(1)
0243         DO 1 I=1,IDIM
0244    1    MSMUZ(I)=NSMUZ(I)
0245         DO 3 I=1,IDIM
0246         DO 2 IC=1,ISMUZ
0247         IL=I-IC
0248         IR=I+IC
0249         IF(IL.LT.1)IL=IL+IDIM
0250         IF(IR.GT.IDIM)IR=IR-IDIM
0251    2    NSMUZ(I)=NSMUZ(I)+MSMUZ(IR)+MSMUZ(IL)
0252    3    CONTINUE
0253         RETURN
0254         END
   FTN4 COMPILER: HP92060-16092 REV. 2001 (791101)
   ** NO WARNINGS ** NO ERRORS **   PROGRAM = 01120     COMMON = 00000
0255         SUBROUTINE CNVLV
0256    C
0257    C    ****************************************************
0258    C    *                                                  *
0259    C    * . SUBROUTINE CNVLV calculates beam N response    *
0260    C    *                                                  *
0261    C    *   to estimate of noise field                     *
0262    C    *                                                  *
0263    C    ****************************************************
0264    C
0265         COMMON LEVEL(64),IRES,IRSP(500),IBC(64),LFELD(1024),IT,
0266        + NFELD(1024),NFDIF(1024),IBW,PI,ISLOB,TOTLI,SL,
0267        + NCORR(1024),IDIF(64),IHWMB,IH3DB,IB,IRESP,ISLSH,LTHRS,INFRQ,
0268        + N,IDIFF,IOVLP,SLSH,ICNV,STDIF,STDIFA,TEPCT(64,4),TWPCT(64,4),
0269        + MLOOP,AVG(64,4),AVGPR(64,4),IFRQ(4),FMED(64,4),ISTRT(4),IEND(4)
0270         DIMENSION MFELD(401)
0271    C
0272    C    CALEB is CALculated Energy on Beam number N
0273    C
0274    C    MFELD is NFELD distorted by beam response
0275    C
0276    C    Contribution from main beam axis
0277    C
0278         MFELD(1)=NFELD(IBC(N))
0279         MFMAX=MFELD(1)
0280         CALEB=10.**(FLOAT(MFMAX)/100.)
0281    C
0282    C    Contributions from other directions in main beam
0283    C
0284         DO 200 I=1,IHWMB
0285         IC=IBC(N)+I
0286         IF(IC.GT.IRES)IC=IC-IRES
0287         MFELD(2*I)=NFELD(IC)+IRSP(I)
0288         IF(MFMAX.LT.MFELD(2*I))MFMAX=MFELD(2*I)
0289         CALEB=CALEB+10.**(FLOAT(MFELD(2*I))/100.)
0290         IC=IBC(N)-I
0291         IF(IC.LT.1)IC=IC+IRES
0292         MFELD(2*I+1)=NFELD(IC)+IRSP(I)
0293         IF(MFMAX.LT.MFELD(2*I+1))MFMAX=MFELD(2*I+1)
0294    200  CALEB=CALEB+10.**(FLOAT(MFELD(2*I+1))/100.)
```

```
0295  C
0296  C       Add side lobes contribution
0297  C
0298          SL=(TOTLI-CALEB)/10.**(FLOAT(ISLOB)/100.)
0299          CALEB=CALEB+SL
0300          LBCAL=IFIX(100.*ALOGT(CALEB))
0301  C
0302  C          IDIFF   Model - Measure
0303  C
0304          IDIFF=LBCAL-LEVEL(N)
0305          IDIF(N)=IDIFF
0306  C
0307  C       ****************************************
0308  C       If IDIFF is positive ,NFELD needs to be
0309  C       decreased on all cells contributing significantly
0310  C       to the beam output ( within 10 dB of the maximum MFELD)
0311  C
0312          LTHRS=100
0313  C
0314  C       ****************************************
0315  C       If IDIFF is negative , NFELD needs to be increased
0316  C       only around the maximum ,within 6 dB of the maximum
0317  C       of MFELD
0318  C
0319          IF(IDIFF.LE.0) LTHRS=60
0320          MMAX=MFMAX-LTHRS
0321          MDIFF=IDIFF
0322  C
0323  C       First test beam center
0324  C
0325          IF(MFELD(1).GE.MMAX) NFDIF(IBC(N))=NFDIF(IBC(N))-(MDIFF*
0326         + (MFELD(1)-MMAX))/(LTHRS/10)
0327          IF(MFELD(1).GE.MMAX) NCORR(IBC(N))=NCORR(IBC(N))+1
0328  C
0329  C       then on both sides of main beam
0330  C
0331          DO 302  I=1,IHWMB
0332          IC=IBC(N)+I
0333          IF(IC.GT.IRES)IC=IC-IRES
0334          IF(MFELD(2*I).GE.MMAX)NFDIF(IC)=NFDIF(IC)-(MDIFF*(MFELD(2*I)
0335         + -MMAX))/(LTHRS/10)
0336          IF(MFELD(2*I).GE.MMAX)NCORR(IC)=NCORR(IC)+1
0337          IC=IBC(N)-I
0338          IF(IC.LT.1)IC=IC+IRES
0339          IF(MFELD(2*I+1).GE.MMAX)NFDIF(IC)=NFDIF(IC)-(MDIFF*
0340         + (MFELD(2*I+1)-MMAX))/(LTHRS/10)
0341          IF(MFELD(2*I+1).GE.MMAX)NCORR(IC)=NCORR(IC)+1
0342   302    CONTINUE
0343          RETURN
0344          END
   FTN4 COMPILER: HP92060-16092 REV. 2001 (791101)
    ** NO WARNINGS ** NO ERRORS **   PROGRAM = 00900     COMMON = 07388
0345          SUBROUTINE BRESP
0346  C
0347  C       ****************************************************
0348  C       *                                                  *
0349  C       *  SUBROUTINE BRESP calculates beam response       *
0350  C       *                                                  *
0351  C       *  BRSP(I) at distance I from beam axis            *
0352  C       *                                                  *
0353  C       ****************************************************
0354  C
0355          COMMON LEVEL(64),IRES,IRSP(500),IBC(64),LFELD(1024),IT,
0356         + NFELD(1024),NFDIF(1024),IBW,PI,ISLOB,TOTLI,SL,
0357         + NCORR(1024),IDIF(64),IHWMB,IH3DB,IB,IRESP,ISLSH,LTHRS,INFRQ,
0358         + N,IDIFF,IOVLP,SLSH,ICNV,STDIF,STDIFA,TEPCT(64,4),TWPCT(64,4),
0359         + MLOOP,AVG(64,4),AVGPR(64,4),IFRQ(4),FMED(64,4),ISTRT(4),IEND(4)
0360  C
0361          DIMENSION WGT(64),BRSP(500)
0362  C
0363  C
0364  C       Loop 1000 compute weight for each hydrophone
0365  C       It also computes the normalisation factor SWGT
0366  C
0367  C       NUM is the number of hydrophones (max=64)
```

```
0368  C       It is set to 40 for the P/S array
0369  C       The weights are computed for HANN weighting
0370  C
0371          IHWMB=((IRES/64)*IOVLP)/10-1
0372          ISLSH=(2*IHWMB)+1
0373          NUM=40
0374          SWGT=0.0
0375             DO 1000 N=1,64
0376             IF(N.GT.NUM) GO TO 1001
0377             VAL=PI*2.*FLOAT(N)/FLOAT(NUM)
0378             WGT(N)=.5-.5*COS(VAL)
0379             GO TO 1000
0380  1001     WGT(N)=0.0
0381  1000     SWGT=SWGT+WGT(N)
0382  C
0383  C       Loop 1010 computes beam response for broadside beam
0384  C
0385  C       ARR is real, AIR is imaginary part of amplitude
0386  C       of beam response in "direction" I
0387  C
0388          IH3DB=0
0389             DO 1010 I=1,IHWMB
0390             PHI=2.0*PI*FLOAT(I)/FLOAT(IRES)
0391             ARR=0.0
0392             AIR=0.0
0393                DO 1011 N=1,NUM
0394                ARR=ARR+WGT(N)*COS(N*PHI)
0395                AIR=AIR-WGT(N)*SIN(N*PHI)
0396  1011        CONTINUE
0397             BRSP(I)=(ARR*ARR+AIR*AIR)/(SWGT*SWGT)
0398             IF(BRSP(I).GE.0.5) IH3DB=IH3DB+1
0399             IRSP(I)=IFIX(100.*ALOGT(BRSP(I)))
0400  1010     CONTINUE
0401  C
0402  C       IBW is correction for beam noise width
0403  C
0404          BW=FLOAT(IRES)*1.5/FLOAT(NUM)
0405          IBW=IFIX(100.*ALOGT(BW))
0406          RETURN
0407          END
      FTN4 COMPILER: HP92060-16092 REV. 2001 (791101)
      ** NO WARNINGS ** NO ERRORS **   PROGRAM = 01441      COMMON = 07388
0408          SUBROUTINE OREST
0409  C
0410  C       *************************************************
0411  C       *                                               *
0412  C       *  SUBROUTINE OREST calculates the first guess  *
0413  C       *  of the noise field to start the iteration    *
0414  C       *                                               *
0415  C       *************************************************
0416  C
0417          COMMON LEVEL(64),IRES,IRSP(500),IBC(64),LFELD(1024),IT,
0418         + NFELD(1024),NFDIF(1024),IBW,PI,ISLOB,TOTLI,SL,
0419         + NCORR(1024),IDIF(64),IHWMB,IH3DB,IB,IRESP,ISLSH,LTHRS,INFRQ,
0420         + N,IDIFF,IOVLP,SLSH,ICNV,STDIF,STDIFA,TEPCT(64,4),TWPCT(64,4),
0421         + MLOOP,AVG(64,4),AVGPR(64,4),IFRQ(4),FMED(64,4),ISTRT(4),IEND(4)
0422  C
0423  C       calculate field value for each cell on the beam axis
0424  C
0425          DO 1 N=1,64
0426  1       NFELD(IBC(N))=LEVEL(N)-IBW
0427  C
0428  C       Then interpolate the other directions
0429  C
0430          ITOT=IRES/64
0431          DO 2 N=1,64
0432          IL=IBC(N)
0433          LL=LEVEL(N)
0434          NN=N+1
0435          IF(NN.EQ.65)NN=1
0436          LR=LEVEL(NN)
0437          DO 3 I=1,ITOT-1
0438          IX=IL+I
0439          IF(IX.GT.IRES)IX=IX-IRES
```

```
0440        3     NFELD(IX)=LL+(LR-LL)*I/ITOT-IBW
0441        2     CONTINUE
0442              END
     FTN4 COMPILER: HP92060-16092 REV. 2001 (791101)
     ** NO WARNINGS ** NO ERRORS **    PROGRAM = 00127      COMMON = 07388
0443              SUBROUTINE NWDAT
0444     C
0445     C        ****************************
0446     C        *                          *
0447     C        *   NWDAT READS DATA       *
0448     C        *                          *
0449     C        *   FROM FILE *PLDAT       *
0450     C        *                          *
0451     C        ****************************
0452     C
0453              COMMON LEVEL(64), IRES, IRSP(500), IBC(64), LFELD(1024), IT,
0454             + NFELD(1024), NFDIF(1024), IBW, PI, ISLOB, TOTLI, SL,
0455             + NCORR(1024), IDIF(64), IHWMB, IH3DB, IB, IRESP, ISLSH, LTHRS, INFRQ,
0456             + N, IDIFF, IOVLP, SLSH, ICNV, STDIF, STDIFA, TEPCT(64,4), TWPCT(64,4),
0457             + MLOOP, AVG(64,4), AVGPR(64,4), IFRQ(4), FMED(64,4), ISTRT(4), IEND(4)
0458     C
0459              DIMENSION IPLDAT(3), IDATCB(144), ISCR(65), PRDIF(64), STDEV(64)
0460              DIMENSION IPOLEG(20), IDEPTH(20), IDATIM(20), IHDING(20), IFLAG(5)
0461              DIMENSION IFREQ(4)
0462     C
0463              EQUIVALENCE (ISCR(1), IPOLEG(1)), (ISCR(18), IDEPTH(1)),
0464             + (ISCR(30), IDATIM(1)), (ISCR(49), IHDING(1)), (ISCR(55), IFREQ(1))
0465              DATA IPLDAT/2H*P, 2HLD, 2HAT/
0466              DATA IPLTCR/12/
0467     C
0468     C        Open the plot data file
0469     C
0470              CALL OPEN(IDATCB, IE, IPLDAT, 0, 0, IPLTCR)
0471              DO 90 INFRQ=1,4
0472              CALL READF(IDATCB, IE, INN, 1)
0473              ISTRT(INFRQ)=INN
0474              CALL READF(IDATCB, IE, INN, 1)
0475              IEND(INFRQ)=INN
0476              CALL READF(IDATCB, IE, ISCR, 61)
0477              DO 30 I=1,64
0478              CALL READF(IDATCB, IE, SDAT, 2)
0479              AVG(I, INFRQ)=SDAT
0480              CALL READF(IDATCB, IE, SDAT, 2)
0481              AVGPR(I, INFRQ)=SDAT
0482              CALL READF(IDATCB, IE, SDAT, 2)
0483              FMED(I, INFRQ)=SDAT
0484              CALL READF(IDATCB, IE, SDAT, 2)
0485              TEPCT(I, INFRQ)=SDAT
0486              CALL READF(IDATCB, IE, SDAT, 2)
0487              TWPCT(I, INFRQ)=SDAT
0488              CALL READF(IDATCB, IE, STDEV(I), 2)
0489              CALL READF(IDATCB, IE, PRDIF(I), 2)
0490       30     CONTINUE
0491       90     CONTINUE
0492              CALL CLOSE (IDATCB, IE)
0493              RETURN
0494              END
```

Figure 7:
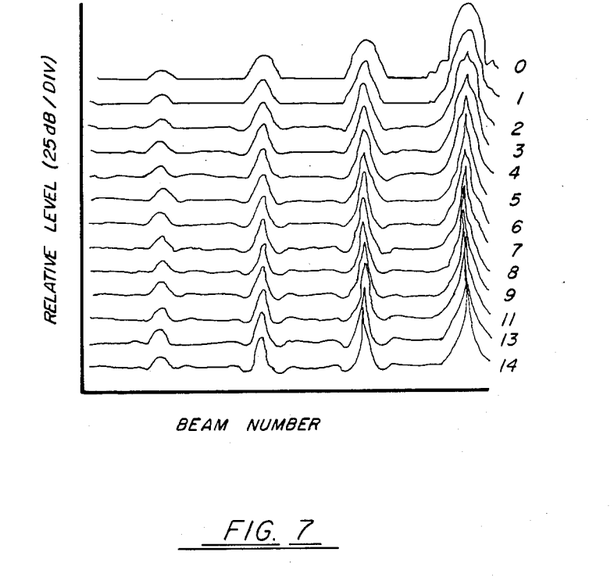
FIG. 7 is graphical depiction of field estimates at successive iteration steps for four lines of white noise.

The following examples used 64 conventional beam levels obtained by FFT from 40 hydrophones with Hann weighting and zero padding. FIG. 7 illustrates the present technique by showing successive field estimates, $N_j$, as the iteration process progresses to a final estimate $N_{14}$. For this example the true field consists of broadband (or spatially) white noise plus four uniformly spaced plane waves having signal-to-noise ratios of $-10$, 0, 10 and 30 dB on a single hydrophone. The initial estimate $N_o$ at the top progresses to $N_{14}$ at the bottom which is shown in greater detail in FIG. 8.

Figure 8:
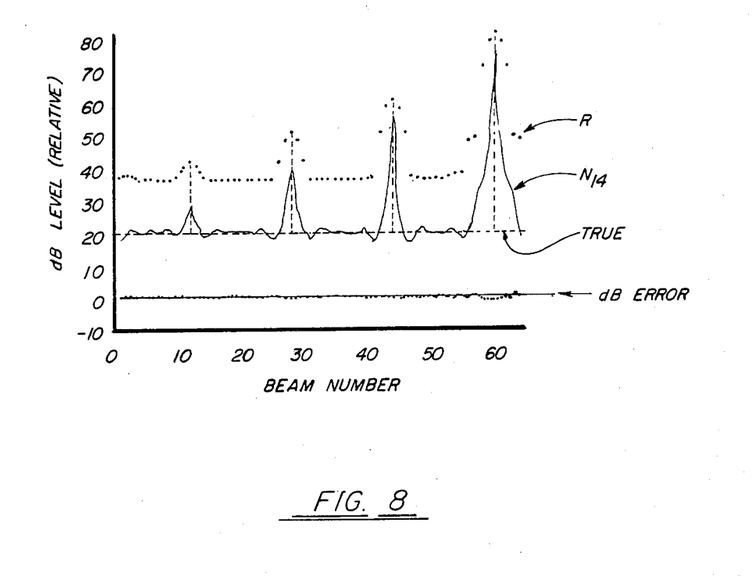
FIG. 8 is a detailed graphical depiction of the final field estimate of FIG. 7.

The dashed vertical lines in FIG. 8 are the original discrete sources and the dashed horizontal line is the original white noise. The dots are the received beam levels R from the spatial FFT. Note the similarity between the shape of the curve which would result from connecting these dots and the initial estimate $N_o$ in FIG. 7. The pulses distributed about 0 dB are the differences $\Delta R_{i,j}$. The residual error is not zero since the present technique is an approximate method, but the mean-squares error is about 0.25 dB and the largest individual error is slightly above 2 dB. Another characteristic of the present technique is the accuracy in locating peaks in the field, which accuracy increases with the signal-to-noise ratios of those peaks.

Figure 9:
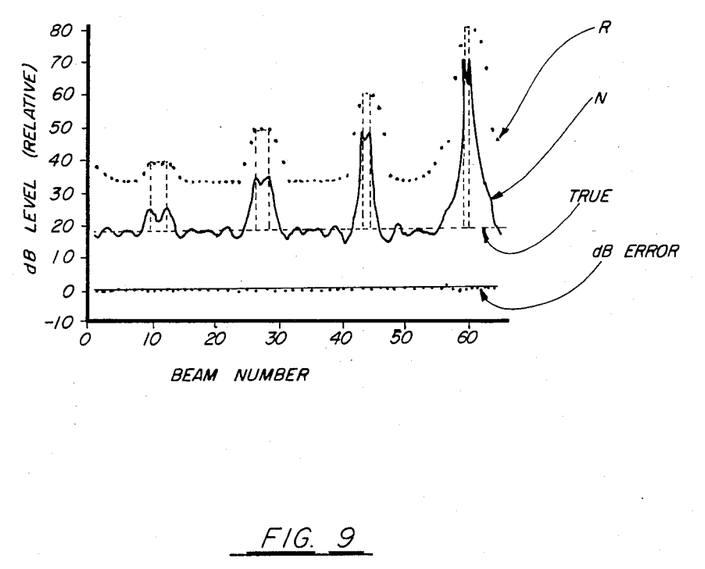
FIG. 9 is a graphical illustration of the final field estimate for four "pairs" of plane waves.

FIG. 9 presents an example where the plane waves of FIGS. 7 and 8 have been replaced with "pairs" of plane waves. The spectral resolution limits of the present technique are shown by the separation in angle of each pair which varies with the signal-to-noise ratio. The separations are 1.25 BW, 1 BW, 0.5 BW and 0.375 BW for the respective pairs where BW is the 3 dB beam-width of the FFT beamformer. The dB levels of the field estimate N and the beam levels R are stored as integer numbers in 0.1 dB steps. As in the previous example, the residual error is due to the approximate character of the present technique with an rms dB error of 0.4 dB.

Figure 10:
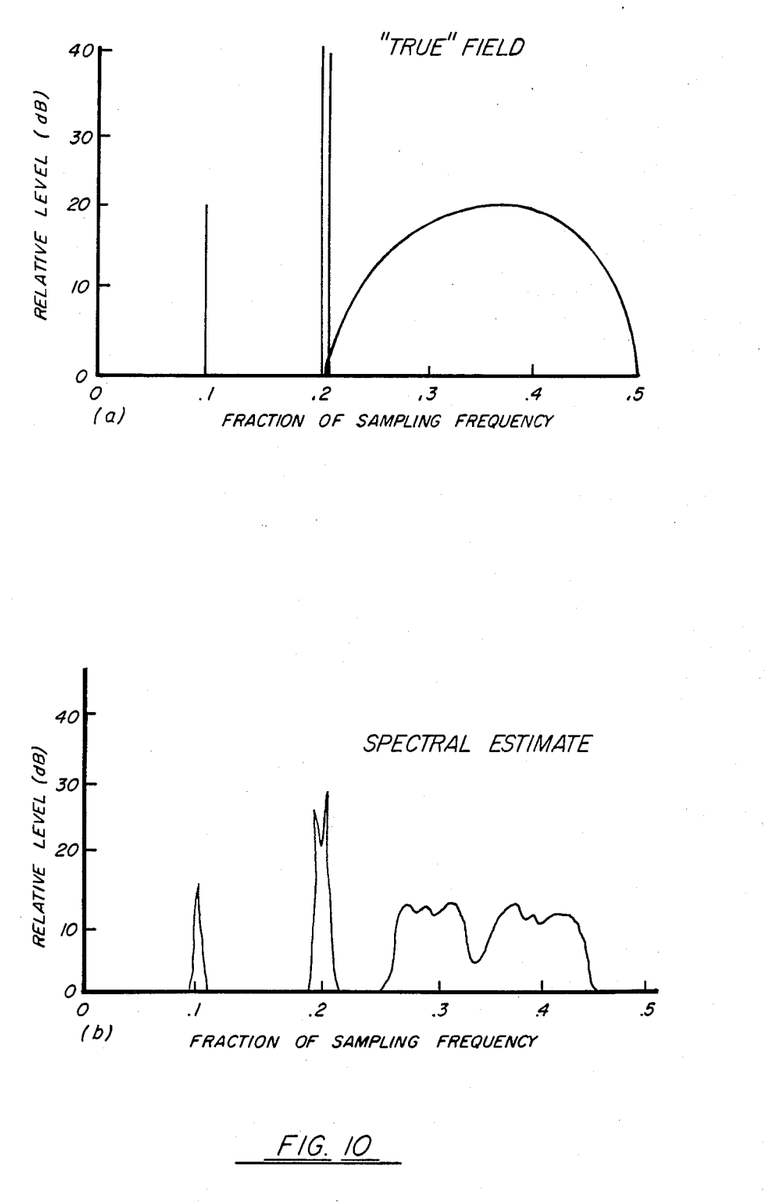
FIG. 10, comprised of FIGS. 10(a) and 10(b), is a graphical illustration of the final field estimate for an idealized spectrum of three sinewaves and colored noise.

FIG. 10 compares the present algorithm with an idealized spectrum (FIG. 10(a)) composed of three sinewaves and colored noise which corresponds to an infinitely long signal. To obtain the final spectral estimate (FIG. 10(b)) the 64 points were first analyzed with a conventional FFT. Sixteen successive overlapping FFTs of 48 points, weighted and padded with 16 zeros, were dB-averaged to obtain the FFT output. This output was input to the present algorithm. The result is a final spectral estimate giving correct positions and levels for the sinewaves, and a reasonably good estimate of the colored noise part of the spectrum, without creating "false peaks" in the noise region.

In many cases the system response function is not perfectly known due to sensitivity change, sensor malfunction without warning, etc. which modify the system response function. The mainlobe response is least affected while sidelobes are drastically affected. But the present techniques use only the mainlobe response and therefore is relatively insensitive to these errors. The present technique can be used with little or no averaging, i.e., on each acquistion, and thus can be linked to the output of a standard beamformer to provide high-resolution spatial spectra.

The present technique requires more elementary operations and more storage than other techniques for small arrays, but is very attractive for large arrays. This is because the operations of the present algorithm are very simple and grow in proportion to the square of the array size, not in proportion to the cube as do most other methods. The memory size grows only in proportion to the number of beams. Even for "small sizes" the large number of the operations is compensated for by the simplicity of the operations; all computations are done on dB levels (except calculating beam levels) and require low precision (10 bits integer additions, subtractions, and comparisions). Even for multidimensional spectral analysis the present technique is still practical, while most other methods need too much storage and calculations to be feasible. The technique can be added to any conventional beamformer system as an add-on "black box" to improve the conventional picture in its totality or locally (zoom), and easily can be expanded to solve problems of acoustic "tomography" and ambiguity resolution.

Thus, the present invention provides a non-linear technique for high-resolution data processing by using a system output and knowledge of the system response function to determine the spectrum of a signal. The mathematics are simplified by operating on decibel quantities in the output domain, consisting of simple additions and subtractions of decibels with the exception of adding the power in $N_j + B_i$ to get the level of the ith beam $R_i$. The technique is relatively insensitive to errors in the output data and knowledge of the system response functions, and can work on a single acquisition to provide virtually realtime analysis.

What is claimed is:

1. A nonlinear technique for high-resolution data processing comprising the steps of:
   a. formulating a spectral estimate of a received signal;
   b. providing a signal processor which generates an output signal proportional to the response function of the signal processor;
   c. convolving said formulated spectral estimate with the response function of said signal processor to obtain an estimated power level output;
   d. measuring the power level output of said signal processor
   e. comparing said estimated power level output with the measured power level output from said signal processor to produce a correction figure;
   f. modifying said spectral estimate with said correction figure;
   g. iterating steps b-$f_1$ using said correction figure in step f as the new spectral estimate of step a up to a maximum number of iterations until said correction figure falls within predetermined criteria; and
   h. outputting said spectral estimate when said predetermined criteria are satisfied.

2. A method as recited in claim 1 wherein said predetermined criteria comprises a minimum root mean square of the difference between said estimated power level output and said measured power level output.

3. A method as recited in claim 1 wherein said modifying step comprises adding to said spectral estimate said correction factor which is an accumulation of changes in power level to be made divided by a smoothed step function equal to a pedestal plus the number of times said spectral estimate requires a change for each point of said spectral estimate.

* * * * *